(12) United States Patent
Sun et al.

(10) Patent No.: US 10,396,953 B2
(45) Date of Patent: Aug. 27, 2019

(54) METHOD AND SYSTEM FOR SENDING A REFERENCE SIGNAL, METHOD AND SYSTEM FOR RECEIVING A REFERENCE SIGNAL

(71) Applicant: Samsung Electronics Co., Ltd., Gyeonggi-do (KR)

(72) Inventors: Pengfei Sun, Beijing (CN); Bin Yu, Beijing (CN); Fang Yuan, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 464 days.

(21) Appl. No.: 14/830,599

(22) Filed: Aug. 19, 2015

(65) Prior Publication Data

US 2016/0056936 A1    Feb. 25, 2016

(30) Foreign Application Priority Data

Aug. 19, 2014   (CN) .......................... 2014 1 0408851

(51) Int. Cl.
  *H04W 4/00*   (2018.01)
  *H04L 5/00*   (2006.01)
  (Continued)

(52) U.S. Cl.
  CPC ........ *H04L 5/0048* (2013.01); *H04L 25/0226* (2013.01); *H04L 25/0228* (2013.01);
  (Continued)

(58) Field of Classification Search
  CPC .............. H04W 72/0413; H04W 88/02; H04W 72/0453; H04L 5/0048; H04L 5/0055
  (Continued)

(56) References Cited

U.S. PATENT DOCUMENTS 6,388,701 B1      5/2002  Lee
2007/0097928 A1*  5/2007  Anderson ............. H04L 5/0037
                                                    370/335
(Continued)

FOREIGN PATENT DOCUMENTS

CN    102780656 A    11/2012
CN    103888406 A     6/2014

OTHER PUBLICATIONS

International Search Report issued for PCT/KR2015/008589 dated Dec. 21, 2015, 4 pgs.

(Continued)

*Primary Examiner* — Atique Ahmed

(57) ABSTRACT

A method and an apparatus for transmitting a reference signal. A first reference signal is generated according to a data signal, an interference relationship between adjacent carriers, and a predefined second reference signal. The data signal and the first reference signal is modulated and sent on a corresponding carrier utilizing non-orthogonal multi-carrier modulation waveform. A method for receiving a reference signal includes receiving, on a reference signal carrier, a first reference signal modulated utilizing non-orthogonal multi-carrier modulation waveform, processing the received first reference signal using a predefined processing method, performing channel estimation or synchronization according to a result of the processing and a predefined second reference signal.

18 Claims, 13 Drawing Sheets

Reference signals and data signals are multiplexed

Blank data carrier

(51) Int. Cl.
*H04L 27/26* (2006.01)
*H04L 25/02* (2006.01)
*H04W 72/04* (2009.01)

(52) U.S. Cl.
CPC ...... *H04L 27/2613* (2013.01); *H04L 27/2627* (2013.01); *H04L 27/2692* (2013.01); *H04L 27/2698* (2013.01); *H04W 72/0453* (2013.01)

(58) Field of Classification Search
USPC ........................................................ 370/329
See application file for complete search history.

(56) References Cited

U.S. PATENT DOCUMENTS

| | | | | |
|---|---|---|---|---|
| 2008/0074990 | A1* | 3/2008 | Kowalski | H04L 5/0048 370/206 |
| 2009/0175367 | A1* | 7/2009 | Kishigami | H04B 7/084 375/260 |
| 2009/0213949 | A1 | 8/2009 | Javaudin | |
| 2009/0268837 | A1* | 10/2009 | Kimura | H04L 5/0007 375/267 |
| 2010/0032227 | A1 | 2/2010 | Oguri et al. | |
| 2010/0110983 | A1* | 5/2010 | Fu | H04J 11/0056 370/328 |
| 2010/0260154 | A1* | 10/2010 | Frank | G01S 5/10 370/336 |
| 2010/0284394 | A1* | 11/2010 | Takata | H04J 13/0003 370/343 |
| 2011/0170468 | A1* | 7/2011 | Jain | H04W 48/12 370/312 |
| 2011/0176499 | A1* | 7/2011 | Siomina | G01S 1/042 370/329 |
| 2011/0261769 | A1* | 10/2011 | Ji | H04L 5/0007 370/329 |
| 2011/0307611 | A1* | 12/2011 | Callard | H04L 5/0023 709/226 |
| 2012/0051265 | A1* | 3/2012 | Shen | H04L 5/0035 370/254 |
| 2012/0243625 | A1 | 9/2012 | Berg | |
| 2013/0142156 | A1* | 6/2013 | Mazzarese | H04L 5/0051 370/329 |
| 2013/0308587 | A1 | 11/2013 | Zhang et al. | |
| 2014/0160949 | A1 | 6/2014 | Clausen et al. | |
| 2014/0177601 | A1* | 6/2014 | Nishio | H04W 24/10 370/332 |
| 2015/0312074 | A1* | 10/2015 | Zhu | H04L 27/2627 370/329 |
| 2017/0034812 | A1* | 2/2017 | Deng | H04W 72/046 |
| 2017/0099172 | A1* | 4/2017 | Ren | H04L 27/264 |

OTHER PUBLICATIONS

Extended European Search Report regarding Application No. 15/833814. 5, dated Mar. 12, 2018, 11 pages.

France Telecom et al., "Some practical aspects of OFDM/OQAM channel estimation", 3GPP TSG RAN WG1#43, R1-051458, Oct. 31, 2005, 6 pages.

Kliks et al., "Power Loading for FBMC Systems: An Analysis with Mercury-filling Approach", 20th International Conference on Telecommunications (ICT), May 2013, 5 pages.

Yoon et al., "Pilot Structure for high Data Rate in OFDM/OQAM-IOTA System", IEEE 68th Vehicular Technology Conference, Sep. 2008, 5 pages.

Office Action dated May 5, 2019 in connection with Chinese Patent Application No. 201410408851.X, 18 pages.

\* cited by examiner

Reference signals and data signals are multiplexed

Blank data carrier

The reference signals and data are multiplexed

Auxiliary reference signal

METHOD AND SYSTEM FOR SENDING A REFERENCE SIGNAL, METHOD AND SYSTEM FOR RECEIVING A REFERENCE SIGNAL

CROSS-REFERENCE TO RELATED APPLICATION AND CLAIM OF PRIORITY

The present application is related to and claims benefit under 35 U.S.C. § 119(a) of Chinese patent application filed on Aug. 19, 2014 in the Chinese Intellectual Property Office and assigned Serial number 201410408851.X, the entire disclosure of which is hereby incorporated by reference.

TECHNICAL FIELD

The present disclosure relates to wireless communication technology, and more particularly, to a method for sending a reference signal, a signal sending device, a method for receiving a reference signal and a signal receiving device, the methods and the devices apply to a non-orthogonal multi-carrier wireless communication system.

BACKGROUND

With the rapid development of the information industry, the wireless communication technology is faced with unprecedented challenges in the future. In the foreseeable future, the need for wireless data services in the world will keep high growth. According to a report from the International Telecommunication Union (ITU), wireless data services will increase at least 1000 times by 2020. In particular countries and regions, the figure may be even higher. In response to the unprecedented challenges, 5G communication technologies research has been extensively launched across the world.

In various potential technologies capable of enhancing spectrum efficiency, the new air interface access technology gradually gets attentions of academics and industry. Because the 5G communication system may be faced with more challenging application scenarios, the conventional modulation waveform and multiple access technology are faced with many challenges, such as more rigorous synchronization requirements, a shorter transmission delay and more fragmented spectrum resources. Based on above mentioned challenges, some more advanced waveforms are taken into account. A Filter Bank Multiple Carrier (FBMC) system has become one of the hotspots of the research. Because a prototype filter is used to perform pulse shaping on the transmission waveform, the transmission signal shows a variety of excellent characteristics, such as a lower requirement on time-frequency synchronization precision and higher time-frequency localization property. In addition, compared with conventional Orthogonal Frequency Domain Multiplexing (OFDM), the FBMC needs no extra Cyclic Prefix (CP), thus the FBMC possesses the higher spectrum efficiency. Based on above mentioned advantages, the FBMC and other possible multi-carrier modulation techniques are included in a technical report "IMT. Future Technology Trends" of the ITU.

However, in a system using the FBMC modulation, in order to obtain the maximal spectrum efficiency, the Offset Quadrature Amplitude Modulation (OQAM) technology is adopted. In the OQAM technology, there is a non-orthogonal relationship between adjacent carriers, that is, a carrier may interfere with an adjacent carrier. The interference may have a serious impact on channel estimation of the system, thus the system reliability will have a significant drop. Many existing methods are provided to resolve the interference problem, but the efficiency of the methods is low. In the description of the present disclosure, some existing methods will be illustrated, and it will be described in detail that how the technical solutions of the present disclosure improve the utilization of the carrier resource and reduce the interference to the reference signal, thus higher channel estimation and synchronization performance may be obtained.

SUMMARY

To address the above-discussed deficiencies, it is a primary object to provide a method for sending a reference signal, a signal sending device, a method for receiving a reference signal and a signal receiving device, the methods and the devices apply to a non-orthogonal multi-carrier wireless communication system, which can achieve better channel estimation or synchronization performance.

In a first embodiment, a method for sending a reference signal provided by examples of the present disclosure includes generating a first reference signal according to a data signal, an interference relationship between adjacent carriers and a predefined second reference signal, modulating the data signal and the first reference signal on a corresponding carrier utilizing non-orthogonal multi-carrier modulation waveform, and sending modulated data signal and modulated first reference signal on the corresponding carrier.

Preferably, the sent first reference signal and the predefined second reference signal are used for performing channel estimation or synchronization by a receiving end.

Preferably, the modulating the data signal and the first reference signal on a corresponding carrier and sending modulated data signal and modulated first reference signal on the corresponding carrier includes modulating the data signal and the first reference signal in the same frame utilizing adjacent carriers in the time domain and/or frequency domain, sending modulated data signal and modulated first reference signal in the same frame.

Preferably, there are at least two first reference signals, the first reference signals are divided into one or more groups, and each group includes at least two first reference signals; carrier positions of first reference signals in the same group are adjacent in the time domain or frequency domain, and first reference signals in the same group are modulated in the same frame and then are sent in the same frame.

Preferably, signals in the same frame are sent through one or more antennas at the same time.

Preferably, the interference relationship between adjacent carriers includes an interference coefficient of one of any two adjacent carriers to the other carrier under given non-orthogonal multi-carrier modulation waveform.

Preferably, generating the first reference signal according to the data signal, the interference relationship between adjacent carriers and the predefined second reference signal includes according to a position of a carrier of the first reference signal, determining an interference coefficient of an adjacent carrier to the carrier of the first reference signal, generating the first reference signal based on a data signal that is sent through one or more antennas on a corresponding adjacent carrier, a corresponding interference coefficient and the predefined second reference signal. Preferably, generating the first reference signal according to the data signal, the interference relationship between adjacent carriers and the predefined second reference signal includes calculating xj according to $f(a, di, \beta mn) = xj$; wherein xj is a first reference signal modulated on carrier j; di is a data signal modulated on an adjacent carrier i of the first reference signal; βmn is an interference coefficient of carrier m to carrier n; a is the predefined second reference signal; f is a method for generating the first reference signal; i,j,m,n=0, 1, . . . ; and the xj generated according to f satisfies g(Xj)=a, wherein Xj is a signal on the carrier j after modulation, g is a predefined processing method.

Preferably, the methodf for generating the first reference signal includes setting a second reference signal power P(a)=Pa, the power of the first reference signal xj generated according to f is minimum, or setting the first reference signal power P(xj)=Pt, the power of corresponding a is maximum.

Preferably, the predefined processing method includes a linear or nonlinear method for processing signals on one or more carriers.

Preferably, the predefined processing method includes performing weighted summation on signals of multiple carriers, or extracting a phase and amplitude of a signal on one or more carriers.

A signal sending device provided by examples of the present disclosure includes a signal generating module and a signal sending module, wherein the signal generating module is configured to generate a first reference signal according to a data signal, an interference relationship between adjacent carriers, and a predefined second reference signal, the signal sending module is configured to modulate the data signal and the first reference signal on a corresponding carrier utilizing non-orthogonal multi-carrier modulation waveform, and send the modulated data signal and the modulated first reference signal on the corresponding carrier.

The method for receiving a reference signal provided by examples of the present disclosure includes receiving, on a reference signal carrier, a first reference signal modulated utilizing non-orthogonal multi-carrier modulation waveform, processing received signal using a predefined processing method, performing channel estimation or synchronization according to a result of the processing and a predefined second reference signal.

Preferably, receiving the first reference signal modulated utilizing non-orthogonal multi-carrier modulation waveform on the reference signal carrier includes receiving the first reference signal xj sent by a sending end on carrier j; wherein xj=f (a, di, βmn, wherein di is a data signal modulated, by the sending end, on an adjacent carrier i of the first reference signal, βmn is an interference coefficient of carrier m to carrier n, a is the predefined second reference signal, f is a method for generating the first reference signal used by the sending end, i,j,m,n=0, 1, . . . , f and xj satisfy g(Xj)=a, j=0, 1, . . . , Xj is a signal on the carrier j after modulation, and g is a predefined processing method.

Preferably, processing received signal using a predefined processing method includes processing the received signal rj using the predefined processing method g, obtaining a processing result e: e=g (rj), wherein, rj, j=0, 1, . . . , is the received signal received on the carrier j by a receiving end.

Preferably, performing channel estimation or synchronization according to a result of the processing and a predefined second reference signal includes taking the processing result e and the predefined second reference signal a as inputs of a channel estimation or synchronization estimation algorithm l, and obtaining H=l(e, a), wherein H is an output of the channel estimation or synchronization estimation algorithm.

The signal receiving device provided by examples of the present disclosure includes a signal receiving module, a signal processing module and an execution module, wherein the signal receiving module is configured to receive, on a reference signal carrier, a first reference signal modulated utilizing non-orthogonal multi-carrier modulation waveform, the signal processing module is configured to process received signal using a predefined processing method, the execution module is configured to perform channel estimation or synchronization according to a processing result and a predefined second reference signal.

From above mentioned technical solutions it can be seen that in the present disclosure, the sending end generates a first reference signal according to a data signal, an interference relationship between adjacent carriers, and a predefined second reference signal, so that the receiving end may perform processing on received signal according to a predefined processing method, and then perform channel estimation or synchronization according to a processing result and the predefined second reference signal. Since the first reference signal after the preprocessing performed by the receiving end only includes, in ideal conditions, the second reference signal and a channel response, and does not include or includes less interference caused by an adjacent carrier, better channel estimation and synchronization performance may be achieved.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
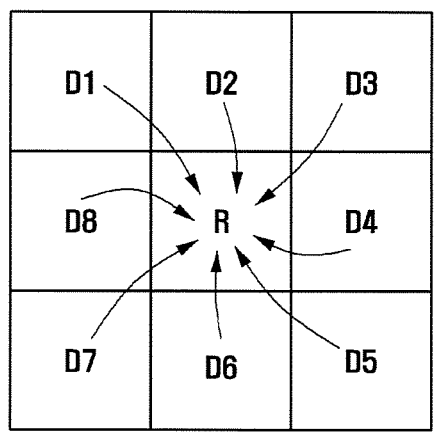
FIG. 1 is a schematic diagram illustrating a protection of reference signal utilizing a blank data carrier.
Figure 1:
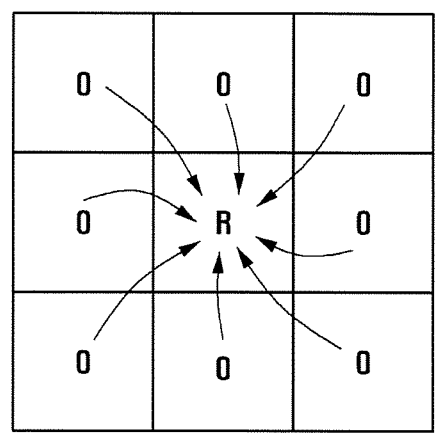

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. In order to make objectives, technical solutions and advantages of the present disclosure clearer, the present disclosure will be described in detail hereinafter with reference to accompanying drawings.

In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples. As used herein, the term "includes" means includes but not limited to, the term "including" means including but not limited to. The term "based on" means based at least in part on. In addition, the terms "a" and "an" are intended to denote at least one of a particular element.

The present disclosure provides a method for transmitting a reference signal, including processing method of a sending end and processing method of a receiving end, which will be respectively described hereinafter according to various examples.

1) A method for sending a reference signal by the sending end.

The sending end generates a first reference signal first according to a data signal, an interference relationship between adjacent carriers and a predefined second reference signal, and then modulates the data signal and the first reference signal on a corresponding carrier utilizing non-orthogonal multi-carrier modulation waveform, and sends the modulated data signal and the modulated first reference signal on the corresponding carrier.

The first reference signal sent by the sending end and the predefined second reference signal are used for performing channel estimation or synchronization by the receiving end.

According to conventional methods, the reference signal is a predefined signal known by the sending end and the receiving end. However, in the present disclosure, the reference signal sent by the sending end is not a predefined reference signal, and is the first reference signal generated according to the data signal, the interference relationship between adjacent carriers and the predefined second reference signal. Compared with the predefined reference signal, the first reference signal is a non-predefined reference signal. In the present disclosure, the non-predefined reference signal is called the first reference signal, and the predefined reference signal is called the second reference signal.

The non-orthogonal multi-carrier modulation waveform includes but is not limited to filter bank multi-carrier (FBMC) modulation waveform.

The data signal and the first reference signal can be modulated in the same frame utilizing adjacent carriers in the time domain and/or frequency domain, and then be sent in the same frame.

There can be at least two first reference signals, the first reference signals are divided into one or more groups, and each group can include at least two first reference signals. The carrier positions of first reference signals in the same group are adjacent in the time domain or frequency domain, and first reference signals in the same group are modulated in the same frame and then are sent in the same frame.

In the present disclosure, signals in the same frame can be sent through one or more antennas at the same time.

The interference relationship between adjacent carriers can include a coefficient of interference of one of any two adjacent carriers to the other carrier under the given non-orthogonal multi-carrier modulation waveform. The coefficient of interference can be called interference coefficient hereinafter.

When the first reference signal is to be generated, according to the position of a carrier of the first reference signal, an interference coefficient of an adjacent carrier to the carrier of the first reference signal can be determined, and then the first reference signal is generated based on a data signal sent through one or more antennas on a corresponding adjacent carrier, a corresponding interference coefficient and the predefined second reference signal.

The sending end generating the first reference signal according to the data signal, the interference relationship between adjacent carriers and the predefined second reference signal will be described with reference to specific symbols and formulas.

At first, $d_i (i=0, 1, \ldots)$ is defined as a data signal modulated on a carrier i adjacent to the first reference signal. $\beta_{mn}$ is defined as an interference coefficient of carrier m to carrier n $(m,n=0, 1, \ldots)$, $x_j$ is defined as the first reference signal modulated on the carrier j $(j=0, 1, \ldots)$, a is defined as the predefined second reference signal, and f is defined as the method for generating the first reference signal.

Subsequently, $x_j$ is calculated according to $f(a, d_i, \beta_{mn})=x_j$. The $x_j$ generated according to f satisfies $g(X_j)=a$. $X_j$ is a signal on the carrier j after modulation, g is a predefined processing method.

The method f for generating the first reference signal includes the followings. Setting a second reference signal power $P(a)=P_a$, the power of the first reference signal $x_j$ generated according to f is minimum. Or setting the first reference signal power $P(x_j)=P_t$, the power of corresponding a is maximum.

The predefined processing method can include one or more processing methods, so that when the sending end sends the first reference signal with normalized power, the receiving end can obtain the highest channel estimation performance or highest synchronization performance via the processing method(s), or the receiving end can obtain the highest Signal to Interference plus Noise Ratio (SINR) of the predefined reference signal from one or more antennas.

Furthermore, the predefined processing method includes but is not limited to: a linear or nonlinear method for processing signals on one or more carriers.

Furthermore, the predefined processing method includes but is not limited to: performing weighted summation on signals of multiple carriers, or extracting a phase and amplitude of a received signal on one or more carriers.

The predefined processing method can include a synchronization estimation method or channel estimation method used by the receiving end. Or the predefined processing method can be preprocessing of the synchronization estimation or channel estimation algorithm used by the receiving end, namely, the predefined processing method can include part of the synchronization estimation or channel estimation algorithm.

Furthermore, the synchronization estimation or channel estimation algorithm includes but is not limited to weighted summation, cross-correlation, self-correlation, or the like.

2) A method for receiving a reference signal by the receiving end.

At first, the receiving end receives, on a reference signal carrier, a first reference signal modulated utilizing non-orthogonal multi-carrier modulation waveform.

Secondly, the receiving end processes received signal using a predefined processing method.

At last, the receiving end performs channel estimation or synchronization according to a processing result and a predefined second reference signal.

The receiving end receiving, on a reference signal carrier, the first reference signal modulated utilizing non-orthogonal multi-carrier modulation waveform can include the following: the first reference signal xj, xj=f (a, di, βmn) sent by the sending end is received on the carrier j. di denotes a data signal modulated, by the sending end, on a carrier i adjacent to the first reference signal; βmn denotes an interference coefficient of carrier m to carrier n; a denotes the predefined second reference signal; f denotes the method for generating the first reference signal used by the sending end; i,j,m,n=0, 1, . . . , wherein f and xj satisfy g(Xj)=a, j=0, 1, . . . , Xj denotes a signal on the carrier j after modulation, and g is a predefined processing method.

Preferably, processing the received signal using a predefined processing method can include the following: the received signal rj is processed using the predefined processing method g, and a processing result e: e=g (rj) is obtained; rj, j=0, 1, . . . , denotes the received signal received on the carrier j by the receiving end.

Preferably, performing channel estimation or synchronization according to the processing result and the predefined second reference signal can include the following: the processing result e and the predefined second reference signal a are taken as the inputs of the channel estimation or synchronization algorithm l, and H=l(e, a) is obtained. His the output of the channel estimation or synchronization algorithm.

The First Non-Limiting Example

In a conventional wireless communication system, the OFDM has gotten extensive application due to the simple implementation, powerful ability to resist the effects of multi-path fading, high spectrum efficiency, and so on, such as the Long Term Evolution (LTE) system corresponding to the Evolved Universal Terrestrial Radio Access (E-UTRA) protocol defined by the 3rd Generation Partnership Project (3GPP). However, with the challenging of future mobile communication, some new non-orthogonal multi-carrier waveforms have gained growing attention. FBMC brings new possibilities for future wireless communication due to the high time-frequency localization waveform. For example, the FBMC can perform pulse shaping on signals of each carrier utilizing a prototype filter, so that the FBMC can obtain excellent receiving robustness under higher time and frequency synchronization error. Meanwhile, benefitting from excellent frequency localization, the FBMC can transmit a signal in extremely narrow frequency resources and keep very low out-of-band leakage. Therefore, FBMC has great potential in cognitive radio and fragmented frequency band utilization. Since the FBMC technology avoids using the CP as in conventional OFDM system, the FBMC has higher spectrum efficiency and energy efficiency than OFDM.

In order to obtain the highest spectrum efficiency under the FBMC waveform, it is necessary for the system to use the OQAM technology. In OQAM, one QAM symbol is divided into two signals, which are alternately modulated to a real part and an imaginary part of one carrier, and are sent alternately in time domain. On the receiving end, without effect of the channel, the real part and the imaginary part of each carrier are alternately extracted, and then the signals are recovered. One time-domain OQAM signal can be described by the following Formula 1:

$$s(m) = \sum_{n=-\infty}^{\infty} \sum_{k=0}^{M-1} \left[ a_n(k)g(m-nM) + b_n(k)g\left(m-nM-\frac{M}{2}\right) \right] e^{\frac{j2\pi mk}{M}} \quad (1)$$

$$\text{in which, } a_n(k) = \begin{cases} \text{Real}(X_n(k)), & \text{when } k \text{ is an even integer} \\ \text{Imag}(X_n(k))j, & \text{when } k \text{ is an odd integer} \end{cases}$$

$$b_n(k) = \begin{cases} \text{Imag}(X_n(k))j, & \text{when } k \text{ is an even integer} \\ \text{Real}(X_n(k)), & \text{when } k \text{ is an odd integer} \end{cases}$$

$X_n(k)$ is a complex QAM signal modulated on the nth carrier of the nth OQAM symbol. M is the total carrier number of the system. g (m), m=0, 1, . . . , KM−1 is the time domain response of the prototype filter. K is a repeating coefficient.

The OQAM signal includes two FBMC symbols modulated by the prototype filter, the two FBMC symbols are sent by delaying M/2 sampling points in time domain.

An OQAM time-domain signal can be represented by the following Formula 2:

$$s(m) = \sum_{n=-\infty}^{\infty} \sum_{k=0}^{M-1} \left[ Z(k)g\left(m-\frac{nM}{2}\right)\theta_{n,k} \right] e^{\frac{j2\pi mk}{M}} \quad (2)$$

$$\text{in which, } \theta_{n,k} = \begin{cases} 1, & \text{when } k+n \text{ is an even integer} \\ j, & \text{when } k+n \text{ is an odd integer} \end{cases}$$

In Formula 2, Z(k) is a real Pulse Amplitude Modulation (PAM) signal to be sent. It should be noted that, one OQAM symbol modulated by the FBMC in Formula 1 equals to two PAM symbols modulated by the FBMC in Formula 2.

On the receiving end, suppose there is no influence of channel and noise, according to Formula 1, when demodulating the QAM signal, the following Formula 3 can be obtained by means of block processing:

$$r_n(k) = \begin{cases} \text{Real}\left(\sum_{m=-\infty}^{\infty} s(m)g^*(m-nM)e^{\frac{-j2\pi mk}{M}}\right) + \\ \text{Imag}\left(\sum_{m=-\infty}^{\infty} s(m)g^*\left(m-nM-\frac{M}{2}\right)e^{\frac{-j2\pi mk}{M}}\right)j \end{cases}, \text{ when } k \text{ is an even integer} \\ \begin{cases} \text{Imag}\left(\sum_{m=-\infty}^{\infty} s(m)g^*(m-nM)e^{\frac{-j2\pi mk}{M}}\right)j + \\ \text{Real}\left(\sum_{m=-\infty}^{\infty} s(m)g^*\left(m-nM-\frac{M}{2}\right)e^{\frac{-j2\pi mk}{M}}\right) \end{cases}, \text{ when } k \text{ is an odd integer} \qquad (3)$$

According to Formula 2, when demodulating the QAM signal, the following Formula 4 can be obtained by means of similar block processing.

$$r_n(k) = \text{Real}\left(\sum_{m=-\infty}^{\infty} s(m)g^*\left(m-\frac{nM}{2}\right)\theta'_{n,k} e^{\frac{-j2\pi mk}{M}}\right) \qquad (4)$$

in which, $\theta'_{n,k} = \begin{cases} 1, & \text{when } k+n \text{ is an even integer} \\ -j, & \text{when } k+n \text{ is an odd integer} \end{cases}$ OQAM is a non-orthogonal multi-carrier transmission technology, so there is non-zero interference between adjacent carriers. The interference can be derived according to a signal model. (k,p) is defined as carrier k on timeslot $$p\frac{M}{2},$$

an interference coefficient of a signal on the carrier k to carrier (k',p') is:

$$\beta_{k,p,k',p'} = \sum_{m=-\infty}^{\infty} g\left(m-p\frac{M}{2}\right)e^{\frac{j2\pi mk}{M}} g^*\left(m-p'\frac{M}{2}\right)e^{\frac{-j2\pi mk'}{M}} \qquad (5)$$

Suppose a signal transmitted on the carrier (k,p) is a real signal 1, and parameters of the prototype filter adopt PHY-DYAS filter parameters, an example of a signal received by the receiving end on the sub-carrier k' at the time p' is shown in table 1. In table 1, the interference between adjacent carriers due to the OQAM modulation is presented.

TABLE 1

|  | p' = p − 3 | p' = p − 2 | p' = p − 1 | p' = p | p' = p + 1 | p' = p + 2 | p' = p + 3 |
|---|---|---|---|---|---|---|---|
| k' = k − 1 | −0.0429j | −0.1250 | 0.2058j | 0.2393 | −0.2058j | −0.1250 | 0.0429j |
| k' = k | −0.0668 | 0 | 0.5644 | 1 | 0.5644 | 0 | −0.0668 |
| k' = k + 1 | 0.0429j | −0.1250 | −0.2058j | 0.2393 | 0.2058j | −0.1250 | −0.0429j |

It can be known from table 1: 1) one transmitted signal can cause interference to multiple adjacent carriers; 2) the interference occurs in a manner of real-imaginary alternation according to a time-frequency position. That is to say, when k−k'+p−p' is an even integer, the interference is a real number, when k−k'+p−p' is an odd integer, the interference is an imaginary number.

In order to make it easier to understand, only amplitude part of an interference coefficient is extracted and the real and imaginary parts of the interference coefficient are omitted in following descriptions:

$$\beta_{k,p,k',p'} = \text{imag}\left\{\sum_{m=-\infty}^{\infty} g\left(m-p\frac{M}{2}\right)e^{\frac{j2\pi mk}{M}} g^*\left(m-p'\frac{M}{2}\right)e^{\frac{-j2\pi mk'}{M}}\right\}, \qquad (6)$$

when $k - k' + p - p'$ is an even integer $$\beta_{k,p,k',p'} = \text{real}\left\{\sum_{m=-\infty}^{\infty} g\left(m-p\frac{M}{2}\right)e^{\frac{j2\pi mk}{M}} g^*\left(m-p'\frac{M}{2}\right)e^{\frac{-j2\pi mk'}{M}}\right\},$$

when $k - k' + p - p'$ is an odd integer

For a wireless communication system, above mentioned adjacent carrier interference will affect the signal detection from two aspects. On the one hand, under a fading channel, the channel response is a complex number, which destroys the property of real-imaginary alternation of a signal modulated by the FBMC waveform, thus the receiving end cannot separate the signal and the interference on each carrier. When the channel is known, the signal detection can be achieved through a channel equalization method. The channel equalization can recover the property of real-imaginary alternation of the received signal, so that the receiver can separate the signal and the interference according to the real and imaginary parts. On the other hand, before the signal is demodulated, above mentioned adjacent carrier interference also influences the channel estimation and synchronization performance of the system. When the reference signal and the data signal are multiplexed and sent, the data signal on an adjacent carrier will interfere with the reference signal. Since the data signal is unknown to the receiving end, the channel estimation will be influenced by an unknown interference. Suppose the reference signal is a real signal 1 sent on carrier (k,p), the received signal is:

$$r_p(k) = H_p(k)x_p(k) + \sum_{k',p'} H_{p'}(k')\beta_{k',p',k,p}d_{p'}(k')j + w_p(k) \quad (7)$$

in which: $x_p(k)$ is a known real reference signal; (k',p') is a carrier adjacent to carrier (k,p); $d_{p'}(k')$ is a real data signal on the adjacent carrier; $\beta_{k',p',k,p}$ is an interference coefficient of carrier (k',p') to carrier (k,p), and can be calculated according to Formula 6. A set of (k',p') includes all (k',p') s each of which can make $\beta_{k',p',k,p}$ be non-zero; $H_p(k)$ and $H_p(k')$ are respectively responses of the channel on carrier (k,p) and carrier (k',p'); $w_p(k)$ is the noise.

$$I_{p'}(k') = \sum_{k',p'} \beta_{k',p',k,p}d_{p'}(k')$$

is defined as an interference term, and suppose $H_p(k)=H_{p'}(k')$, the received signal can be written as:

$$r_p(k)=H_p(k)x_p(k)+H_p(k)I_{p'}(k')j+w_p(k) \quad (8)$$

According to Formula 8, when there is no influence of channel and noise, the interferences caused by the data signals are imaginary numbers, the receiver can separate the interferences by extracting the real part. However, because $H_p$ is an unknown complex scalar, the receiver cannot distinguish the reference signal and the interference. If the channel estimation is performed only according to the received signal $r_p(k)$, the channel estimation will be seriously affected by $H_p(k')I_{p'}(k')j$ and the performance will be largely degraded.

Several known methods for overcoming the interferences caused by the data signals will be described hereinafter.

In one known method, the interference to the reference signal is eliminated using the Interference Approximation Method (JAM). As shown in the left side of FIG. 1, when the data signal (on carrier D) and the reference signal (on carrier R) are multiplexed and sent, the reference signal will be interfered by the data signal. In addition, suppose one reference signal is interfered only by eight direct adjacent data signals, for instance data signals on carriers D1~D8 shown in FIG. 1. In order to enhance the performance of channel estimation, it is necessary for the system to reduce the interference caused by the eight data signals. As shown in the right side of FIG. 1, when the eight data signals around the reference signal are set as 0 on the sending end, the interference $I_{p'}(k')$ that the reference signal suffers on the receiving end will be 0. Therefore the channel estimation can adopt a method similar to that in the OFDM system without considering the interference. However, the method wastes large amounts of data carrier resources, and causes a serious decline of the spectrum efficiency.

Figure 2:
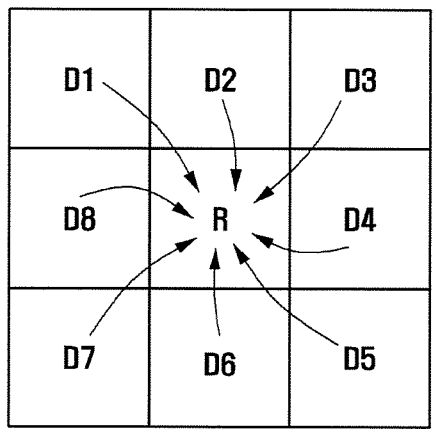
FIG. 2 is a schematic diagram illustrating a protection of reference signal utilizing an auxiliary reference signal.
Figure 2:
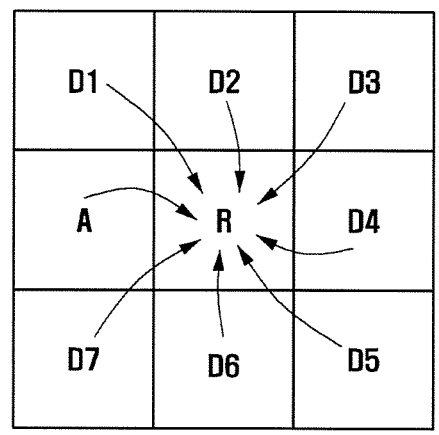

To overcome the drawbacks of the IAM, in another existing technology, an auxiliary reference signal method is used. As shown in FIG. 2, an adjacent data signal (on carrier D8) of the reference signal (on carrier R) is replaced by an auxiliary reference signal (on carrier A). The sending end calculates and obtains a value of the auxiliary reference signal according to the values of all data signals (on carriers D1~D7). The value of the auxiliary reference signal can make the interference $I_{p'}(k')$ suffered by the reference signal be 0, namely:

$$I_{p'}(k') = \sum_{\substack{p',k' \\ p',k' \neq p_A,k_A}} \beta_{k',p',k,p}d_{p'}(k') + \beta_{k_A,p_A,k,p}d_{p_A}(k_A) = 0 \quad (9)$$

The value of the auxiliary reference signal calculated according to Formula 9 is:

$$d_{p_A}(k_A) = -\frac{\sum\limits_{\substack{p',k' \\ p',k' \neq p_A,k_A}} \beta_{k',p',k,p}d_{p'}(k')}{\beta_{k_A,p_A,k,p}} \quad (10)$$

Based on the above analysis and FIG. 2, it can be seen that the auxiliary reference signal method only requires two symbols to perform the channel estimation. One of the two symbols is used to send the reference signal, and the other is used to send the auxiliary reference signal. The value of the auxiliary reference signal is calculated and obtained according to the values of data signals on adjacent carriers, so the auxiliary reference signal cannot be used for the channel estimation, and is only used for eliminating the interference of the data signals on the adjacent carriers to the reference signal. Compared with the IAM, the auxiliary reference signal method reduces the carrier waste, and improves the spectrum efficiency.

Because being a random value, the auxiliary reference signal cannot be used for the channel estimation, thus half of carrier resources will be still wasted using the auxiliary reference signal method.

The present disclosure provides a new neighboring dual reference signal method to perform channel estimation and synchronization. In this method, each of reference signals could be used for channel estimation or synchronization, thus the carrier utilization rate can be improved, and the better channel estimation or synchronization performance can be achieved. Meanwhile, the method also successfully solves the interference problem caused by data signals on the adjacent carriers. Finally, compared with the auxiliary reference signal method, under a given sending power, the method can obtain higher SINR for the received signal, thereby obtaining higher channel estimation or synchronization performance.

Figure 3:
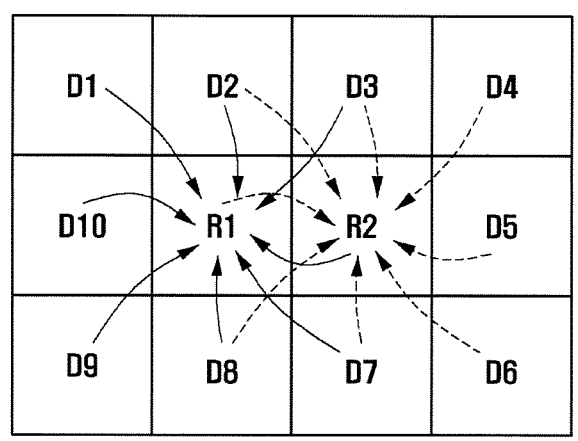
FIG. 3 is a schematic diagram illustrating neighboring dual reference signals according to an example of the present disclosure.

To simplify matters, in the example, two neighboring dual reference signals are used. As shown in FIG. 3, according to the indication of solid arrows, the reference signal sent on carrier R1 can be interfered by signals on carriers D1, D2, D3, R2, D7, D8, D9 and D10; according to the indication of dotted arrows, the reference signal sent on carrier R2 can be interfered by signals on carriers D2, D3, D4, D5, D6, D7, D8 and R1. Suppose the responses of the channel on all carriers are the same, the received signals on carriers R1 and R2 of the receiver are as below:

$$r_1 = Hx_1 + H \sum_{i=1,2,3,7,8,9,10} \beta_{i,R_1} d_i j + H\beta_{R_2,R_1} x_2 j \quad (11)$$

$$r_2 = Hx_2 j + H \sum_{i=2,3,4,5,6,7,8} \beta_{i,R_2} d_i + H\beta_{R_1,R_2} x_1$$

in which, $x_1$, $x_2$, are non-predefined reference signals, the non-predefined reference signals are real numbers; $d_i$ is a real data signal modulated on carrier Di (i=1, 2, . . . , 10) in FIG. 3; H are responses of the channel on the reference signal and the data signals; $\beta_{i,R_1}$ is an interference coefficient of carrier Di to carrier R1; $\beta_{R_2,R_1}$ is an interference coefficient of carrier R2 to carrier R1; $\beta_{i,R_2}$ is an interference coefficient of carrier Di to carrier R2; $\beta_{R_1,R_2}$ is an interference coefficient of carrier R1 to carrier R2. Above mentioned coefficients can be obtained from table 1, for example, $\beta_{1,R_1}$=0.2058. According to the definition of Formula 6, every interference coefficient here is only the amplitude in the table 1, the real and imaginary parts of the interference coefficient has been integrated into Formula 11. In the example, the receiving end adopts a predefined processing method of linear weighted summation to perform preprocessing on received non-predefined reference signal, and estimates the channel, namely:

$$e = r_1 + w_2 r_2 \quad (12)$$

in which, e is an output of the linear preprocessing, meanwhile, e is also an input of the channel estimation, $w_2$ is a weighting coefficient. In order to obtain better channel estimation performance, when $w_2$ is selected, it is necessary to ensure that e has a higher SINR. When $w_2$=0, e=1, it is found that above mentioned method is the same as the auxiliary reference signal method.

In the example, $w_2$=1 is selected, then in the neighboring dual reference signal method, $x_1$, $x_2$ are calculated so that:

$$r_1 + r_2 = H(a+bj) \quad (13)$$

Above formula is equivalent to:

$$(1+\beta_{R_1,R_2})x_1 + (1+\beta_{R_2,R_1})x_2 j + \quad (14)$$
$$\sum_{i=1,2,3,7,8,9,10} \beta_{i,R_1} d_i j + \sum_{i=2,3,4,5,6,7,8} \beta_{i,R_2} d_i = a+bj$$

According to Formula 14, the following Formula 15 is obtained:

$$x_1 = \frac{a - \sum_{i=2,3,4,5,6,7,8} \beta_{i,R_2} d_i}{(1+\beta_{R_1,R_2})} \quad (15)$$

-continued $$x_2 = \frac{b - \sum_{i=1,2,3,7,8,9,10} \beta_{i,R_1} d_i}{(1+\beta_{R_2,R_1})}$$

It can be known according to above algorithm, under a defined receiving end preprocessing algorithm (such as the linear summation), the sending end can calculate and obtain the reference signals $x_1$, $x_2$ to be sent, namely, the non-predefined reference signals (namely the first reference signals) according to known interference coefficients $\beta_{i,R_1}$, $\beta_{i,R_2}$, $\beta_{R_1,R_2}$, $\beta_{R_2,R_1}$ and known data signals $d_i$. When the signals arrive the receiving end after passing through the channel, the receiving end performs preprocessing on signals on the reference signal carriers according to the defined preprocessing algorithm, in ideal conditions (no noise, and channel responses on all carriers are the same), the output of a preprocessor will only include the predefined reference signal (namely the second reference signal) and the channel response. If $r_1$, $r_2$ are signals on corresponding carriers after the modulation performed by the sending end, $r_1$, $r_2$ include non-predefined reference signals $x_1$, $x_2$, the interference between $x_1$ and $x_2$, and the interference caused by data signals on adjacent carriers. When the same predefined processing method is applied to process the signals modulated by the sending end: $e=r_1+w_2r_2(w_2=1)$, the predefined second reference signal $r_1+r_2=(a+bj)$ can also be obtained.

Suppose the predefined reference signal is a+bj=1+j, it can be seen that the neighboring dual reference signal method obtains a complex reference signal whose power is 2. By contrast, the auxiliary reference signal method only obtains a real reference signal whose power is 1 utilizing the same carrier resources. Since the preprocessing method of linear summation is used, the noise power using the neighboring dual reference signal method is doubled, and thus the SINRs obtained by the two methods are the same. Although the SINRs at the receiving end are the same, the sending powers used by the two methods at the sending end are different. According to Formula 15, the sending power needed by the neighboring dual reference signal method is $E\{x_1^2\}+E\{x_2^2\}$; according to Formula 10, the sending power needed by the auxiliary reference signal method is $1+E\{d_{PA}^2(k_A)\}$. Suppose the data signals are Binary Phase Shift Keying (BPSK) modulation signals, and the patterns of reference signals of the two methods are respectively shown in FIG. 2 and FIG. 3, according to the table 1, the sending powers can be calculated as below:

$$E\{x_1^2\}+E\{x_2^2\}=1.3096$$

$$1+E\{d_{PA}^2(k_A)\}=2.89$$

As can be seen, the sending power used by the neighboring dual reference signal method of the present disclosure is less than that used by the auxiliary reference signal method. Therefore, when using the same sending power, the neighboring dual reference signal method will obtain better channel estimation performance than the auxiliary reference signal method. Suppose $E\{x_1^2\}+E\{x_2^2\}=2.89$, $a^2+b^2=2.93$ can be calculated according to Formula 15. That is to say, when using the neighboring dual reference signal method, the SINR gain of about 4.6 dB can be achieved.

Figure 7:
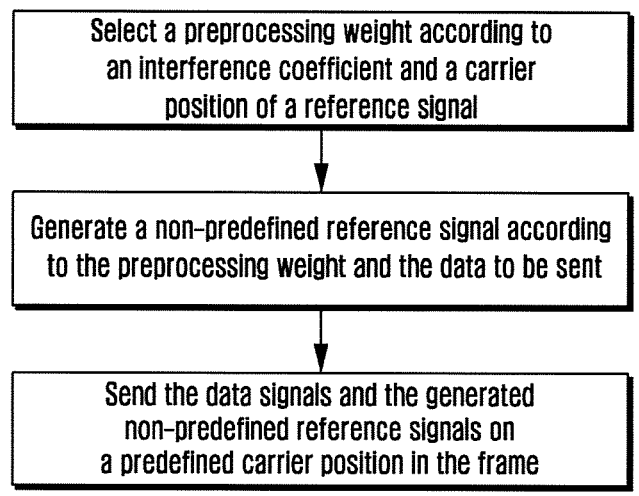
FIG. 7 is a flowchart illustrating a neighboring dual reference signal method on the sending end according to a first example of the present disclosure.
Figure 8:
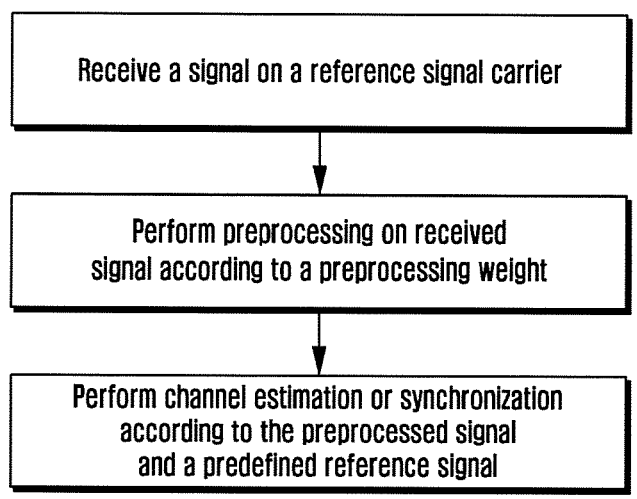
FIG. 8 is a flowchart illustrating the neighboring dual reference signal method on the receiving end according to the first example of the present disclosure.

FIG. 7 is a flowchart illustrating a neighboring dual reference signal method on the sending end according to the first example of the present disclosure. FIG. 8 is a flowchart illustrating the neighboring dual reference signal method on the receiving end according to the first example of the present disclosure. The neighboring dual reference signal method adopts a linear preprocessing method.

The method shown in FIG. 7 can include the following operations.

In first step, a preprocessing weight is selected according to an interference coefficient and a carrier position of a reference signal.

A weight used by a preprocessing method is called a preprocessing weight for short (here suppose the preprocessing method is a linear preprocessing method), the preprocessing weight can be calculated in advance according to the modulation waveform used by the system and design requirement of the reference signal. The preprocessing weight will be simultaneously used on the sending end and the receiving end.

In second step, when sending a data frame, the sending end can generate a non-predefined reference signal according to the preprocessing weight and data to be sent. Since the non-predefined reference signal is generated based on a random data signal, the reference signal is also a random signal.

In third step, the sending end sends a data signal in the data frame on a corresponding data carrier and sends the generated non-predefined reference signal on a corresponding reference signal carrier.

The method shown in FIG. 8 can include the following operations.

The receiving end receives a signal on the reference signal carrier first, then performs preprocessing on received signal according to above pre-obtained preprocessing weight, and finally, performs channel estimation or synchronization according to the preprocessed signal and a value of a predefined reference signal (the second reference signal).

It should be noted that, the preprocessing method used in the example is only an exemplary method, and other different preprocessing methods can also be used in the method of the present disclosure. The selection of the preprocessing method depends on different factors, such as the interference coefficients $\beta_{R_1,R_2}$ and $\beta_{R_2,R_1}$. The specific preprocessing algorithm needs to be designed by taking into account of specific interference coefficients and all corresponding factors.

A second non-limiting example.

Figure 4:
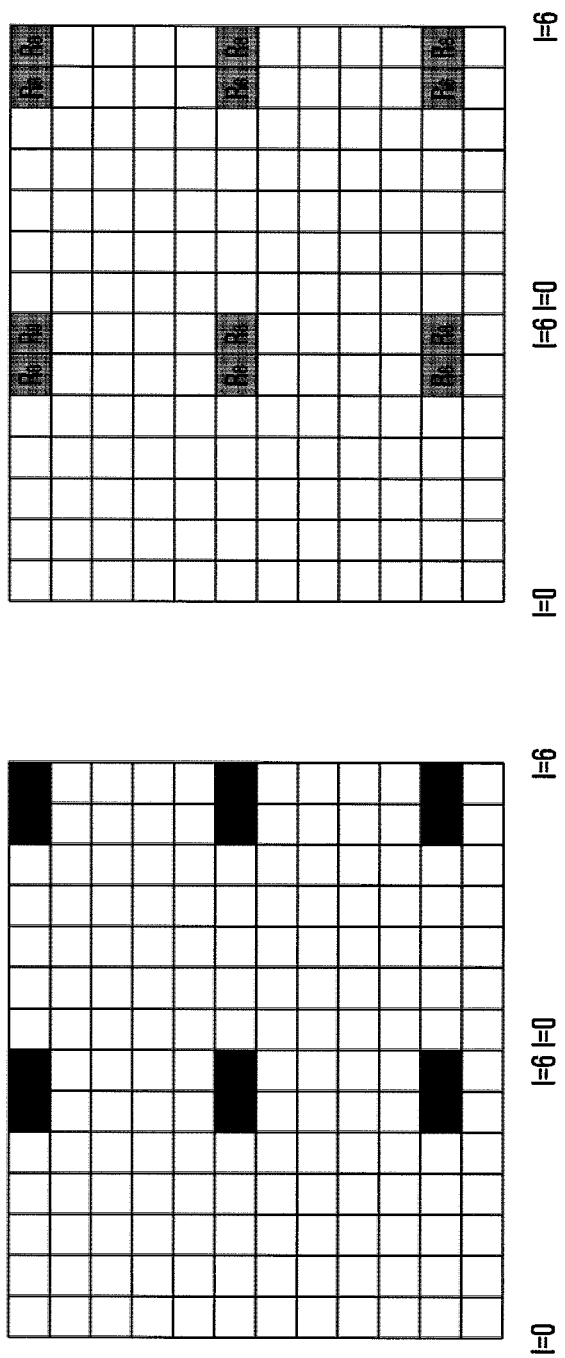
FIG. 4 is a schematic diagram illustrating a pattern of a demodulation reference signal in the LTE system.

In the example, how above neighboring dual reference signal method applies to a wireless transmission system based on a frame structure will be described; meanwhile how to achieve multi-antenna channel estimation in the FBMC system will be also described. FIG. 4 is a schematic diagram illustrating a pattern of a demodulation reference signal in the LTE system. As shown in FIG. 4, each frame includes 14 OFDM symbols, two antenna ports R7 and R8 utilizing the same time-frequency resources are differentiated via orthogonal codes [1,1] and [1,−1].

Figure 5A:
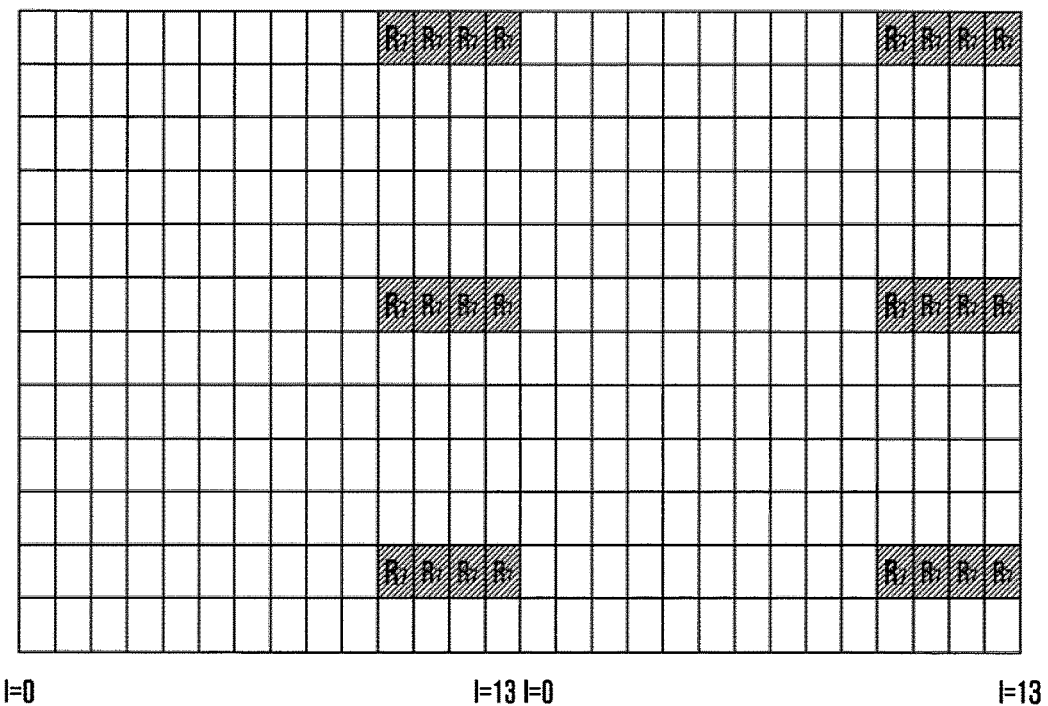
FIG. 5A and FIG. 5B are schematic diagrams illustrating a frame structure of FBMC and a pattern of continuous reference signals in the time domain used in a second example of the present disclosure.
Figure 5B:
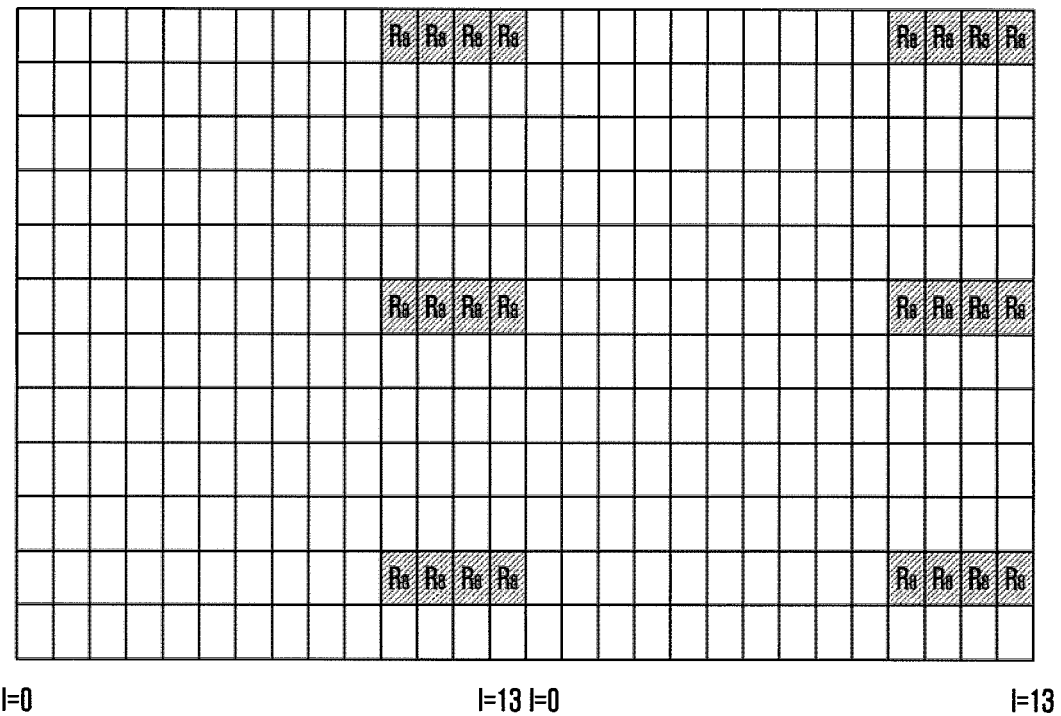
Figure 6A:
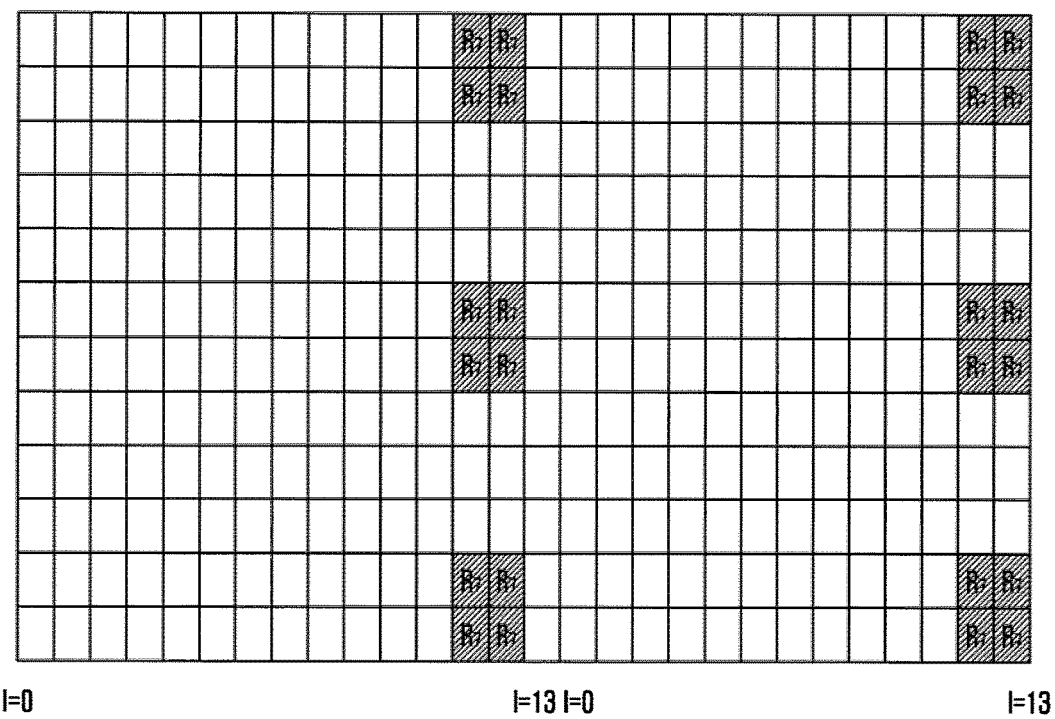
FIG. 6A and FIG. 6B are schematic diagrams illustrating another frame structure of FBMC and a pattern of continuous reference signals in the time-frequency domain used in the second example of the present disclosure.
Figure 6B:
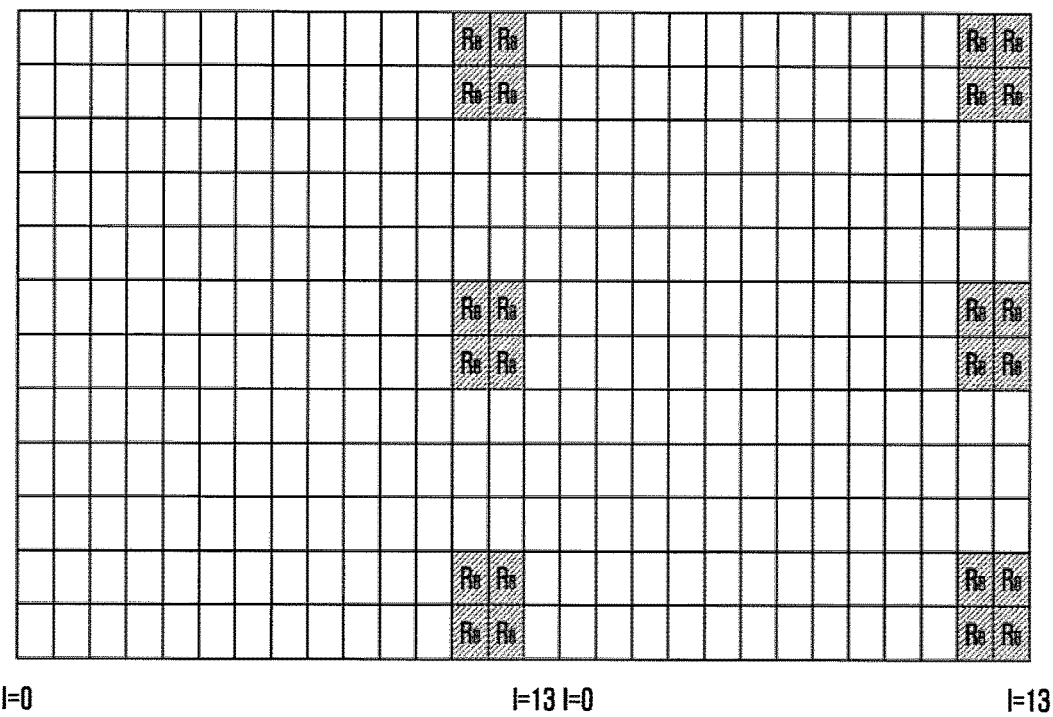

Suppose one system utilizing FBMC waveform uses the same frame structure, and needs to provide two orthogonal ports for channel estimation, the frame structure and the pattern of a reference signal used by the system can be shown in FIGS. 5A and 5B and FIGS. 6A and 6B. FIGS. 5A and 5B are the schematic diagrams illustrating a frame structure of FBMC and a pattern of continuous reference signals in the time domain. FIGS. 6A and 6B are the schematic diagrams illustrating another frame structure of FBMC and a pattern of continuous reference signals in the time-frequency domain.

Since one QAM symbol of the OQAM is divided into two paths of signals for transmission, each frame in FIGS. 5A and 5B and FIGS. 6A and 6B includes 28 symbols. To achieve the same resource efficiency as the DMRS of the LTE, 24 carriers are used to transmit the reference signals, and each reference signal group includes 4 carriers. Among the 4 carriers of each group, two carriers are used to perform the neighboring dual reference signal method in the first example. Orthogonal codes are used between every two groups to differentiate multiple antenna ports.

In one system utilizing the configuration of reference signals shown in FIG. 4, the followings are respectively defined: $X=[x_1,x_2,x_3,x_4]$ denotes the four reference signals sent on antenna port 7; $X'=[x'_1,x'_2,x'_3,x'_4]$ denotes the four reference signals sent on antenna port 8; $I=[I_1,I_2,I_3,I_4]$ denotes the interference suffered by the four reference signals of the antenna port 7; $I'=[I'_1,I'_2,I'_3,I'_4]$ denotes the interference suffered by the four reference signals of the antenna port 8; $R_1,R_2,R_3,R_4$ are the four reference signals received by a specific receiving antenna; and $H_1,H_2$ are respectively channel responses from antenna port 7 to the receiving antenna and from antenna port 8 to the receiving antenna.

Let:

$$R_1+R_2=H_1(a+bj)+H_2(a'+b'j)$$

$$R_3+R_4=H_1(a+bj)-H_2(a'+b'j) \quad (16)$$

According to Formula 16, it can be obtained that:

$$\begin{bmatrix} \beta & 0 \\ 0 & \beta \end{bmatrix} X + I = A \quad (17)$$

in which, $$\beta = \begin{bmatrix} 1+\beta_{R_1,R_2}, & 0, & \beta_{R_3,R_2}, & 0 \\ 0, & 1+\beta_{R_2,R_1}, & 0, & 0 \\ 0, & 0, & 1+\beta_{R_3,R_4}, & 0 \\ 0, & \beta_{R_4,R_3}, & 1, & 1 \end{bmatrix}$$

$$X = \begin{bmatrix} X \\ X' \end{bmatrix},$$

$$I = \begin{bmatrix} I_2 \\ I_1 \\ I_4 \\ I_3 \\ I'_2 \\ I'_1 \\ I'_4 \\ I'_3 \end{bmatrix},$$

$$A = \begin{bmatrix} a \\ b \\ a \\ b \\ a' \\ b' \\ -a' \\ -b' \end{bmatrix}$$

The value of the non-predefined reference signal to be sent could be calculated according to Formula 17:

$$X = \begin{bmatrix} \beta & 0 \\ 0 & \beta \end{bmatrix}^{-1} (A - I)$$

A third non-limiting example.

Figure 9:
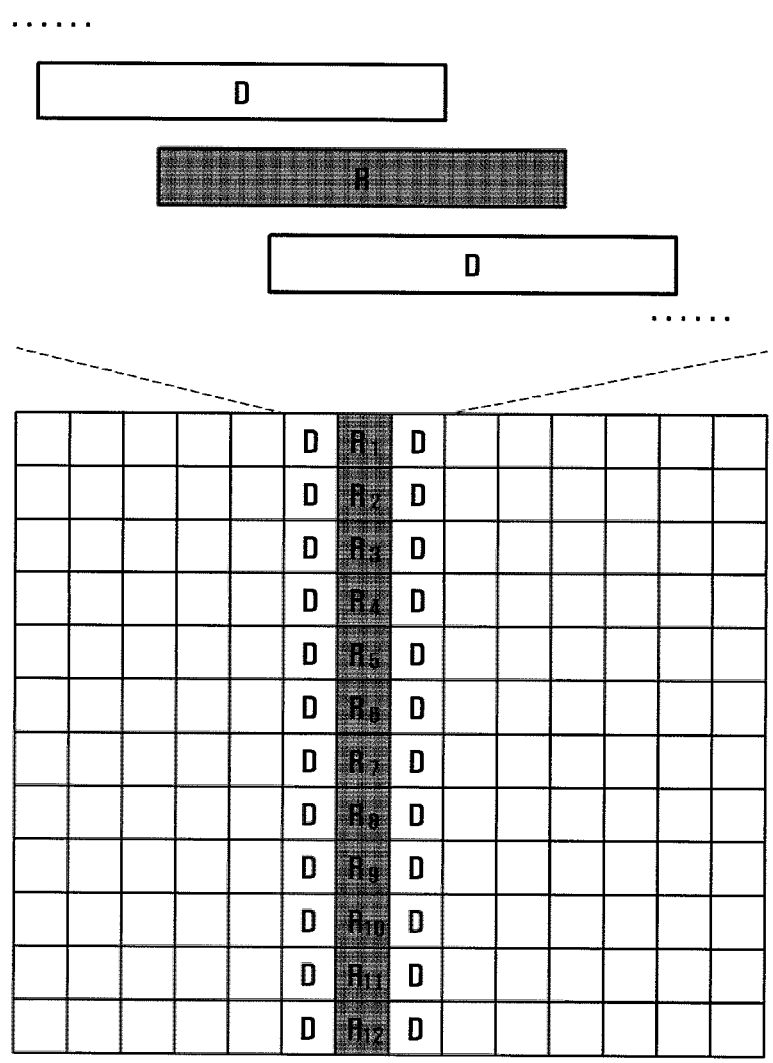
FIG. 9 is a schematic diagram illustrating a frame structure and a pattern of a pilot sequence base on the FBMC according to a third example of the present disclosure.

In the example, how above neighboring dual reference signal method applies to the synchronization preamble will be described. In the communication system, it is necessary to achieve the initial time-frequency synchronization through a dedicated preamble sequence. For instance, the initial synchronization of the LTE is achieved through the PSS/SSS sequence. Because the LTE adopts OFDM modulation method, the PSS/SSS sequence can be easily multiplexed into the data channel, and the interference is avoided. If a system adopts FBMC modulation method, a synchronization preamble similar to the PSS/SSS sequence will be interfered by data signals on adjacent carriers, as shown in FIG. 9. Different from the channel estimation, due to that the receiver has not obtained time and frequency synchronization information when receiving the synchronization preamble, the receiver cannot obtain a frequency domain preamble sequence, and then the receiver cannot perform preprocessing on a frequency domain signal as in the first example. Therefore, the receiver can only detect a synchronization preamble through a specific synchronization algorithm. For example, a frequently-used synchronization sequence detection algorithm includes: performing cross-correlation on a received signal and a local sequence, detecting the synchronization preamble through the energy of an correlation output signal. Therefore, when using the neighboring dual reference signal method, the design of a reference signal needs to take into account of the specific synchronization preamble detection algorithm to be used rather than a preprocessing algorithm. According to the method in the first example, if the receiver is in accurate sampling timing, output data of the synchronization detection algorithm is not interfered by the data signals.

A Fourth Non-Limiting Example.

Besides the Demodulation Reference Signal (DMRS), there are other dedicated reference signals in the communication system, such as, a Channel state information-reference signal (CSI-RS) used for channel measurement, or a Common reference signal (CRS) used for demodulation and time-frequency synchronization tracking. Since one OQAM symbol always corresponds to two carriers, the neighboring dual reference signal method is always able to be applied to different reference signal types.

Corresponding to above methods, the present disclosure also provides a signal sending device and a signal receiving device, which will be respectively described hereinafter.

Figure 10:
FIG. 10 is a schematic diagram illustrating a signal sending device according to various examples of the present disclosure.

FIG. 10 is a schematic diagram illustrating a signal sending device according to various examples of the present disclosure. As shown in FIG. 10, the signal sending device includes a signal generating module and a signal sending module.

The signal generating module is configured to generate a first reference signal according to a data signal, an interference relationship between adjacent carriers, and a predefined second reference signal.

The signal sending module is configured to modulate the data signal and the first reference signal on a corresponding carrier utilizing non-orthogonal multi-carrier modulation waveform, and send the modulated data signal and the modulated first reference signal on the corresponding carrier.

Figure 11:
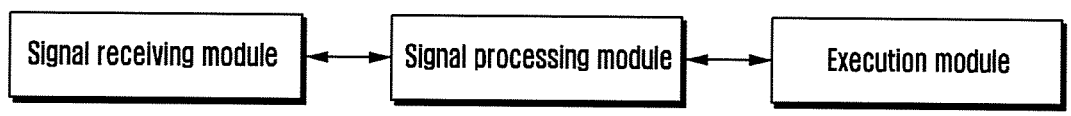
FIG. 11 is a schematic diagram illustrating a signal receiving device according to various examples of the present disclosure.

FIG. 11 is a schematic diagram illustrating a signal receiving device according to various examples of the present disclosure. As shown in FIG. 11, the signal receiving device includes a signal receiving module, a signal processing module and an execution module.

The signal receiving module is configured to receive, on a reference signal carrier, the first reference signal modulated utilizing non-orthogonal multi-carrier modulation waveform.

The signal processing module is configured to process received signal using a predefined processing method.

The execution module is configured to perform channel estimation or synchronization according to a processing result and a predefined second reference signal.

Although the present disclosure has been described with an exemplary embodiment, various changes and modifications can be suggested to one skilled in the art. It is intended that the present disclosure encompass such changes and modifications as fall within the scope of the appended claims.

What is claimed is:

1. A method by a transmitting device, comprising:
generating at least two first reference signals based on at least two second reference signals predetermined in resource elements,
wherein the at least two first reference signals have adjacent positions in a time domain or in a frequency domain, and
wherein each of the at least two first reference signals is generated based on data signals, an interference coefficient between adjacent carriers, each of the at least two second reference signals, and a predetermined function;
modulating the data signals and the at least two first reference signals using non-orthogonal multi-carrier modulation waveform; and
transmitting the modulated data signals and the modulated at least two first reference signals.

2. The method of claim 1, wherein the at least two first reference signals are used by a receiving device to obtain the at least two second reference signals by processing the at least two first reference signals based on the predetermined function.

3. The method of claim 1, wherein modulating the data signals and the at least two first reference signals comprises modulating the data signals and the at least two first reference signals in the same frame using adjacent carriers in the frequency domain or adjacent symbols in the time domain.

4. The method of claim 1, wherein transmitting the modulated data signals and the modulated at least two first reference signals comprises transmitting the modulated data signals and the modulated at least two first reference signals in a same frame,
wherein the data signals and the at least two first reference signals in the same frame are transmitted through one or more antennas at a same time.

5. The method of claim 2, wherein the at least two first reference signals are determined based on a position of a carrier of the at least two first reference signals.

6. A transmitting device, comprising:
a transceiver; and
a controller coupled with the transceiver and configured to:
generate at least two first reference signals based on at least two second reference signals predetermined in resource elements, wherein the at least two first reference signals have adjacent positions in a time domain or in a frequency domain, and wherein each of the at least two first reference signals is generated based on data signals, an interference coefficient between adjacent carriers, each of the at least two second reference signals, and a predetermined function, modulate the data signals and the at least two first reference signals using non-orthogonal multi-carrier modulation waveform, and transmit the modulated data signals and the modulated at least two first reference signals.

7. The transmitting device of claim 6, wherein the at least two first reference signals are used by a receiving device to obtain the at least two second reference signals by processing the at least two first reference signals based on the predetermined function.

8. The transmitting device of claim 6, wherein the controller is configured to modulate the data signals and the at least two first reference signals in the same frame using adjacent carriers in the frequency domain or adjacent symbols in the time domain.

9. The transmitting device of claim 6, wherein the controller is configured to transmit the modulated data signals and the modulated at least two first reference signals in a same frame.

10. The transmitting device of claim 7, wherein the at least two first reference signals are determined based on a position of a carrier of the at least two first reference signals.

11. A method by a receiving device, comprising:

receiving a modulated at least two first reference signals and modulated data signals, wherein the at least two first reference signals have adjacent positions in a time domain or in a frequency domain, and wherein each of the at least two first reference signals is generated based on data signals, an interference coefficient between adjacent carriers, each of at least two second reference signals, and a predetermined function;

determining the at least two second reference signals by processing the modulated at least two first reference signals and the modulated data signals; and receiving data based on the at least two second reference signals.

12. The method of claim 11, wherein the at least two first reference signals and the data signals are modulated in the same frame using adjacent carriers in the frequency domain or adjacent symbols in the time domain.

13. The method of claim 11, wherein the modulated data signals and the modulated at least two first reference signals are received in the same frame.

14. The method of claim 12, wherein the at least two first reference signals are determined based on a position of a carrier of the at least two first reference signals.

15. A receiving device, comprising:

a transceiver; and a controller coupled with the transceiver and configured to:

receive modulated at least two first reference signals and modulated data signals, wherein the at least two first reference signals have adjacent positions in a time domain or in a frequency domain, wherein each of the at least two first reference signals is generated based on data signals, an interference coefficient between adjacent carriers, each of at least two second reference signals, and a predetermined function, determine the at least two second reference signals by processing the modulated at least two first reference signals and the modulated data signals, and receive data based on the at least two second reference signals.

16. The receiving device of claim 15, wherein the at least two first reference signals and the data signals are modulated in the same frame using adjacent carriers in the frequency domain or adjacent symbols in the time domain.

17. The receiving device of claim 15, wherein the controller is configured to receive the modulated data signals and the modulated at least two first reference signals in the same frame.

18. The receiving device of claim 16, wherein the at least two first reference signals are determined based on a position of a carrier of the at least two first reference signals.

* * * * *